(12) United States Patent
Balabanian

(10) Patent No.: US 6,882,639 B1
(45) Date of Patent: Apr. 19, 2005

(54) TELECOMMUNICATIONS MIDDLEWARE

(75) Inventor: Vahe Jirair Balabanian, Nepean (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/157,533

(22) Filed: Sep. 21, 1998

(51) Int. Cl.$^7$ .......................... G01R 31/08; G06F 11/00; H04J 1/16; H04J 3/14; H04L 1/00; H04L 12/26
(52) U.S. Cl. ...................................... 370/353; 370/237
(58) Field of Search ..................... 370/229, 235–237, 370/351, 389, 400–401, 230, 352–356

(56) References Cited

U.S. PATENT DOCUMENTS

| | | | | |
|---|---|---|---|---|
| 5,481,542 A | | 1/1996 | Logston et al. | 370/94.2 |
| 5,671,225 A | | 9/1997 | Hooper et al. | 370/468 |
| 5,732,078 A | * | 3/1998 | Arango | 370/355 |
| 5,898,673 A | * | 4/1999 | Riggan et al. | 370/237 |
| 6,064,653 A | * | 5/2000 | Farris | 370/237 |
| 6,154,445 A | * | 11/2000 | Farris et al. | 370/237 |
| 6,330,316 B1 | * | 12/2001 | Donak et al. | 370/236 |

OTHER PUBLICATIONS

ISO/IEC CD 14496–6, "Information Technology –Generic Coding of Moving Pictures and Associated Audio Information –Part 6: Delivery Multimedia Integration Framework", pp. 1–82.
DSM–CC Sub Group, "Answers to the DSM–CC FAQ Version 1.1.", International Organization for Standardization Organization International Normalization ISO/IEC JTC1/SC29/WG11 Coding of Moving Pictures and Associated Audio, Apr. 11, 1997, pp. 1–16.

Vahe Balabanian, "A Method for the Transparent Transfer of a MPEG–4 ES from one Connection to Another", International Organization for Standardization Organization International Normalization ISO/IEC JTC1/SC29/WG11 Coding of Moving Pictures and Associated Audio, Apr. 11, 1997, pp. 1–2.

* cited by examiner

*Primary Examiner*—Kwang Bin Yao
*Assistant Examiner*—Kevin C. Harper

(57) ABSTRACT

The invention is a proposed extension to ISO/IEC standard 14496-6 (DMIF) and is partly described in ISO/IEC working document 14496-6 V2 WD 3.0. Specifically, the invention is a novel method for allowing the delivery of a streamed multimedia service across a heterogeneous network configuration without establishing a new session. In one embodiment, the invention is applicable to a scenario in which first and second terminals are directly connected to a first network and indirectly connected to a second network via respective access networks. Each terminal comprises terminal middleware and there is also a network middleware component connected to the terminals and to the access networks and to the second network. In essence, the method comprises the steps of establishing a session between the first and second terminals through the first network; transmitting a first plurality of multimedia streams from the first terminal to the second terminal across the first network, each stream being associated with a respective desired quality of service (QoS); measuring the QoS of each of the first plurality of streams; and if the measured QoS of one or more of the first plurality of streams is less than the respective desired QoS, transmitting said at least one or more of the first plurality of streams through the access networks and the at least one second network during said session.

11 Claims, 2 Drawing Sheets

TELECOMMUNICATIONS MIDDLEWARE

CROSS-REFERENCES TO INTERNATIONAL STANDARDS

The invention described herein refers to two international standards, namely, ISO/IEC standard 14496-6, entitled "Delivery Multimedia Integration Framework" (DMIF) and ISO/IEC standard 13818-6, entitled "Digital Storage Media Command and Control" (DSM-CC). The invention itself is partly described in ISO/IEC working document 14496-6 V2 WD 3.0, which is a proposed extension to DMIF.

FIELD OF THE INVENTION

The present invention relates to telecommunications middleware and particularly to a method for seamlessly enhancing the viewing quality of a streamed multimedia service by involving additional network resources.

BACKGROUND OF THE INVENTION

Data terminals in a multimedia-capable network typically comprise an application portion, used for requesting, receiving or providing a multimedia service, and a middleware portion forming a content-transparent and network-aware software process for interfacing between the application and the network. The nature of the terminals may range from set-top boxes to personal computers to file servers, while the multimedia services may include the delivery of motion pictures (movies), audio-visual teleconferencing services and live television broadcasts.

Recently, the telecommunications art has seen the introduction of streamed multimedia services that involve transmitting the content associated with a multimedia service as a multiplicity of data streams. The received streams are combined by the application at the receiving end to reproduce the original multimedia content as a whole. The viewing quality of a particular multimedia service is generally proportional to the relative number and quality of service (QoS) of individual multimedia streams successfully recombined by the receiving application.

Since it is desirable to offer multimedia services to as many terminals as possible, it is thus most useful to deliver the associated multimedia streams across a homogeneous, ubiquitous network, such as the public switched telephone network (PSTN) or the Internet. However, such networks possess inherent limitations having regard to bandwidth, transmission delay or both, which impacts negatively on the perceived viewing quality of the multimedia service. For example, in the case of a bandwidth restriction, it is simply not possible to deliver more than a limited number of streams at a specified bandwidth for each stream, consequently limiting the achievable viewing quality. On the other hand, transmittal of many streams through a network with a large delay may result in only a few of the streams actually being delivered within an acceptable amount of time, again adversely affecting the viewing quality.

One way of improving the viewing quality of a particular streamed multimedia service is to use connection resources from another network to which the receiving terminal has access, thereby using the additional network resources either to transmit complementary multimedia streams or to improve the QoS of certain ones of the original multimedia streams, e.g., high-priority streams having high QoS requirements. However, while each terminal is connected to the homogeneous network (thereby allowing the provision of a basic viewing quality for a particular multimedia service), it is to be appreciated that not all terminals will be connected to additional networks and therefore not all terminals will have the capability of enhancing the viewing quality of the streamed multimedia service in question.

Therefore, it is desirable to design a middleware for use by data terminals permitting the initial delivery of a basic number of multimedia streams over a homogeneous network as well as the subsequent transfer of certain ones of these streams upon request over an additional network, if the terminals are indeed connected to the additional network. It is also desirable to allow, in certain instances, the transmission of complementary multimedia streams using the additional network resources.

It is not difficult to find references to prior art solutions which tackle the first point, albeit in isolation. For example, ISO/IEC standard 14496-6, entitled "Delivery Multimedia Integration Framework" (DMIF) and hereby incorporated by reference herein, defines a terminal middleware which "allows applications to transparently access and view multimedia streams whether the source of the stream is located on an interactive remote end-system, the stream is available on broadcast media or it is stored on media."

Moreover, ISO-IEC standard 13818-6, entitled "Digital Storage Media Command and Control" (DSM-CC) and hereby incorporated by reference herein, defines a middleware which allows the use of heterogeneous network configurations. That is to say, "DSM-CC relies on end-to-end significant association tags to preserve the thread of continuity of a stream across networks of different transport technologies," as quoted from ISO/IEC JTC1/SC29/WG11 submission N1691 in section 2.6, which submission is hereby incorporated by reference herein.

In DSM-CC, a "session" is begun by setting up the delivery of one or more multimedia streams between the middlewares in corresponding terminals over a network with the involvement of a set of network functions and resources collectively known as the session and resource manager (SRM). The SRM can also be used to set up the delivery of additional multimedia streams between the terminals over the same network or over additional networks. The SRM is also used for billing and for logging data related to network resource usage.

While DSM-CC appears to provide the second desirable feature described above, involving additional network resources, it does not actually allow a session already begun over a homogeneous network to remain intact while transferring certain ones of the initial set of multimedia streams over to the additional network resources. Similarly, given the establishment of a session between terminals across a homogeneous network, a request for supplementary multimedia streams by a target application (connected to additional network resources) will be rejected by a prior art SRM and an improvement in viewing quality is possible if and only if the initial session is struck down and an entirely new session is begun with the aid of the SRM.

Clearly, this problem constricts ubiquity, as it would in fact be desirable to provide the ability to set up a number of initial multimedia streams over a homogeneous network (without the aid of an SRM), and to subsequently upgrade the viewing quality of the streamed multimedia service by providing the delivery of supplementary streams across (or transferring a subset of the initial streams over to) additional network resources by invoking an SRM or, more generally, a network middleware.

SUMMARY OF THE INVENTION

It is an object of the present invention to mitigate or obviate one or more disadvantages of the prior art.

Therefore, the invention may be summarized according to a first broad aspect as a method of delivering a streamed multimedia service from a first terminal to a second terminal, both terminals being directly connected to a first network and indirectly connected to at least one second network via respective access networks, the method comprising the steps of: establishing a session between the first and second terminals through the first network; transmitting a first plurality of multimedia streams from the first terminal to the second terminal across the first network, each stream being associated with a respective desired quality of service (QoS); measuring the QoS of each of the first plurality of streams; and if the measured QoS of any stream or streams of the first plurality of streams is less than the respective desired QoS, transmitting said any stream or streams through the access networks and the at least one second network during said session.

According to a second broad aspect, the invention may be summarized as a method of delivering a streamed multimedia service from a first terminal to a second terminal, both terminals being directly connected to a first network and indirectly connected to at least one second network via respective access networks, each terminal comprising a respective terminal middleware, wherein the first and second terminal and each of the at least one second network are connected to a common network middleware, the method comprising the steps of: the terminal middlewares in the first and second terminals establishing a session through the first network; the first terminal transmitting a first plurality of multimedia streams to the second terminal across the first network, each stream being associated with a respective desired quality of service (QoS); measuring the QoS of each of the first plurality of streams and deriving a delivered viewing quality therefrom; comparing the delivered viewing quality of the multimedia service to a specified viewing quality; and if the delivered viewing quality is inferior to the specified viewing quality: the first or second terminal sending a message to the network middleware, thereby requesting to use resources in the access networks and the at least one second network; and if sufficient resources exist in the access networks and the at least one second network: the network middleware granting the request; the terminal middlewares in the first and second terminals establishing a connection through the access network and the at least one second network; and the first terminal transmitting at least one stream to the second terminal across the access networks and the at least one second network during said session.

According to a third broad aspect, the invention may be summarized as a computer-readable storage-medium for installation in a telecommunications network configuration comprising plurality of terminals, at least one first network interconnecting the plurality of terminals, a plurality of access networks respectively connected to certain ones of the terminals and at least one second network interconnecting the access networks, comprising: a plurality of terminal middlewares respectively connected to the plurality of terminals, for sending and receiving multimedia streams between the terminals; a network middleware connected to the access networks, to the at least one second network and to the terminal middleware of the terminals connected to respective access networks, for establishing connections among said terminals through the at least one second network.

The invention may be summarized according to a fourth broad aspect as a communications network configuration comprising: a homogeneous first network; at least one second network; a plurality of access networks connected to the second network by respective inter-working units; a plurality of terminals connected to the first network and to the at least one second network, each terminal comprising a terminal middleware for sending and receiving multimedia streams; an application connected to the terminal middleware for reconstructing multimedia content from streams arriving from the terminal middleware and for segmenting multimedia content into streams passed to the terminal middleware; a first signalling map for connection to the first network; and a second signalling map for connection to a respective one of the plurality of access network; and network middleware connected to the at least one second network, to the at least one access network, to the inter-working units and to the second signalling map of each terminal.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1:
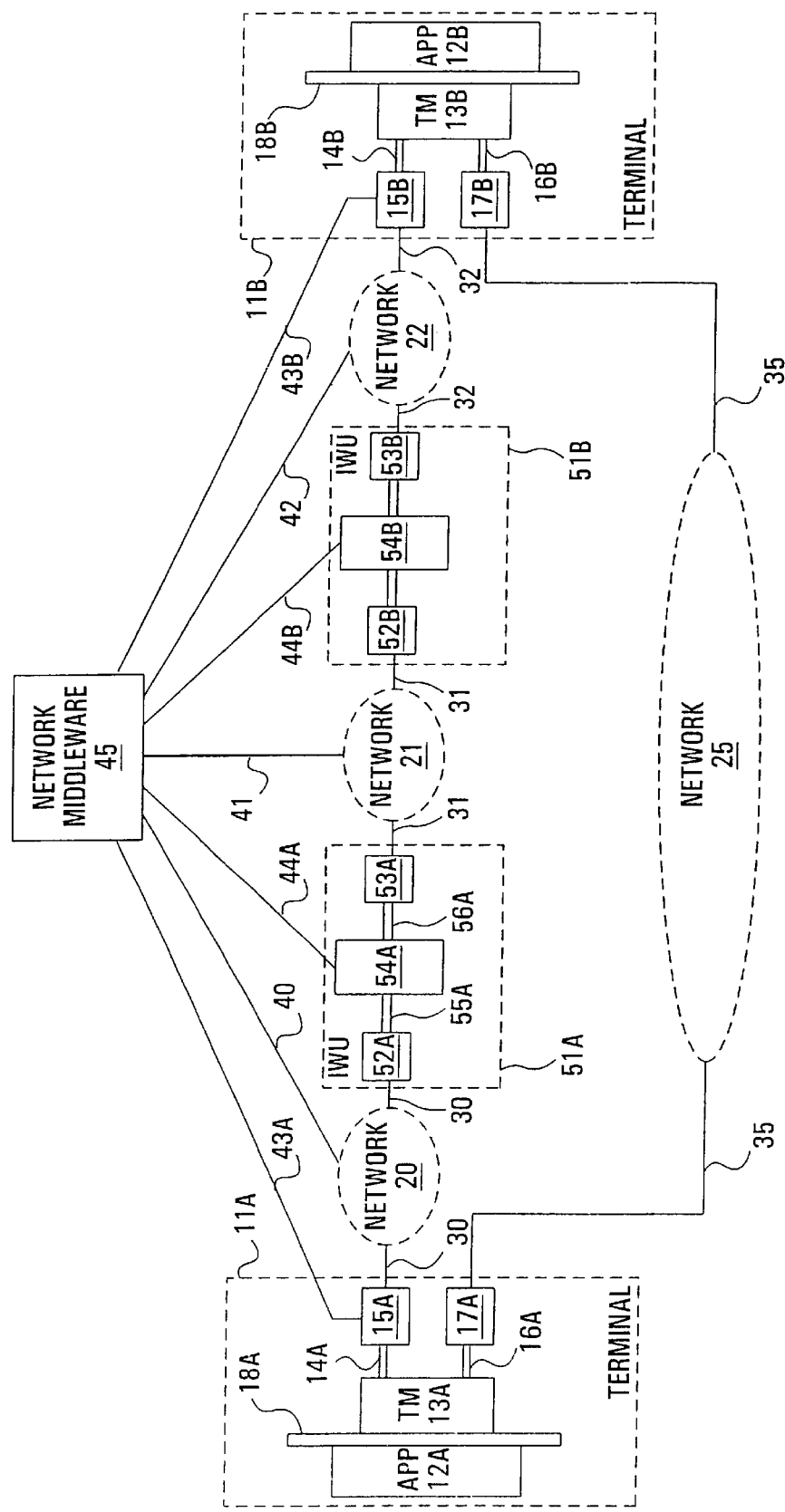
FIG. 1 shows a multimedia network configuration, comprising two terminals communicating through a plurality of networks.

With reference to FIG. 1, two data terminals 11A,B are assumed to have access to the same, homogeneous network 25 for exchanging multimedia streams offering a basic viewing quality for a given streamed multimedia service. While the homogeneous network 25 is typically ubiquitous, the achievable viewing quality is often quite poor since either only a limited number of multimedia streams is capable of being successfully transmitted or because the quality of the connection for the available streams is inadequate. Therefore, a secondary path used to improve the viewing quality by transferring or complementing the multimedia streams is provided by a heterogeneous network arrangement consisting of access networks 20,22 respectively connected to terminals 11A,B and also connected to a common network 21 through respective inter-working units (IWUs), or "gateways" 51A,B.

There are many possible network configurations which share the generic architecture illustrated in FIG. 1. For example, homogeneous network 25 may represent the Internet or an integrated services digital network (ISDN), network 21 may consist of a "backbone" ATM network and networks 20 and 22 may represent respective digital subscriber loops carrying IP (Internet protocol) traffic using PPP (point-to-point protocol) over ATM. In other instances, access networks 20 and 22 may be intranets, hybrid fiber coax access networks carrying ATM cells or different portions of the PSTN (public switched telephone network), while the common network 21 may also be an intranet or any other network that is traversed between access networks 20 and 22. The IWUs 51A,B used to link the various networks may consist of IP routers, RTP (real-time transfer protocol) mixers or RTP translators, as appropriate.

Terminals 11A,B are identical in structure and therefore it suffices to limit their description to a discussion of terminal 11A only. Thus, terminal 11A is comprised of a software application 12A linked to a terminal middleware 13A by a software DMIF-application interface (DAI) 18A. The terminal middleware 13A is then linked via a logical DMIF-network interface (DNI) 16A to a signalling map 17A, which communicates with the homogeneous network 25 by means of a native signalling protocol 35, such as ITU-T Q.931 for N-ISDN, ITU-T Q.2931 for ATM, ITU H.225 or IP addressing with RSVP (resource reservation protocol). The terminal middleware 13A is also connected via a second logical DNI 14A to another signalling map 15A, which communicates with access network 20 using a suitable native signalling protocol 30.

In a practical network configuration, one terminal may be a server, such as a file server containing a database of files corresponding to motion pictures, while the corresponding application may be a program that segments a chosen movie into MPEG-4 streams for delivery to a client. Such a client may be represented by the other data terminal and may consist of a set-top box on which the corresponding application performs reconstruction and local playback of the delivered MPEG-4 streams representing the selected movie.

Under other circumstances, terminals 11A,B may be peers, such as personal computers sharing a local area network (LAN) and participating in a conference call controlled by applications 12A,B. In yet another scenario, terminal 11B may be a server at a television station, delivering a live television broadcast, while terminal 11A may be one of many home television sets (clients), both being hooked up via respective cable modems running respective applications 12B and 12A.

In addition to allowing the delivery of multimedia streams across the homogeneous network 25, the network configuration of FIG. 1 also permits the delivery of multimedia streams across the heterogeneous network arrangement consisting of networks 20–22 employing respective signalling protocols 30–32. However, since these protocols may differ greatly from one another, it is necessary to convert them at IWUs 51A,B. Specifically, IWU 51A comprises two signalling maps 52A,53A, two DNIs 55A,56A and an intermediate middleware 54A. The signalling maps 52A,53A are respectively connected to networks 20,21 and respectively communicate via DNIs 55A,56A to the intermediate middleware 54A. Communications between network 21 and network 22 involve IWU 51B and are effected in a manner similar to that just described with reference to networks 20 and 21.

In accordance with the present invention, the network configuration of FIG. 1 also comprises a network middleware component 45 connected to the terminals 11A,B, to each of the networks 20–22 and to both IWUs 51A,B. As with the SRM in DSM-CC, the network middleware 45 performs session and resource management and keeps track of resource usage for billing purposes. The network middleware 45 is preferably a software program distributed among SRM nodes (not shown) connected to the networks 20–22, to the IWUs 51A,B and to the terminal middlewares 13A,B. In the preferred embodiment of the present invention, the network middleware 45 is unaware of any session in existence between terminals 11A,B through the homogeneous network 25.

Communication between the network middleware 45 and the terminal middlewares 13A,B in terminals 11A,B is preferably effected by means of respective control protocols 43A,B respectively connecting the network middleware 45 with the signalling maps 15A,B. A suitable protocol would be an extended version of DSM-CC user-to-network signalling. On the other hand, communication between the network middleware 45 and the networks 20–22 is achieved through the use of control protocols 40–42 which are proxies for the respective native signalling protocols 30–32. Finally, communication between the network middleware and the intermediate middleware 54A,B in the respective IWUs 51A,B is achieved through the use of respective control protocols 44A,B, both of which may in fact be identical.

Figure 2:
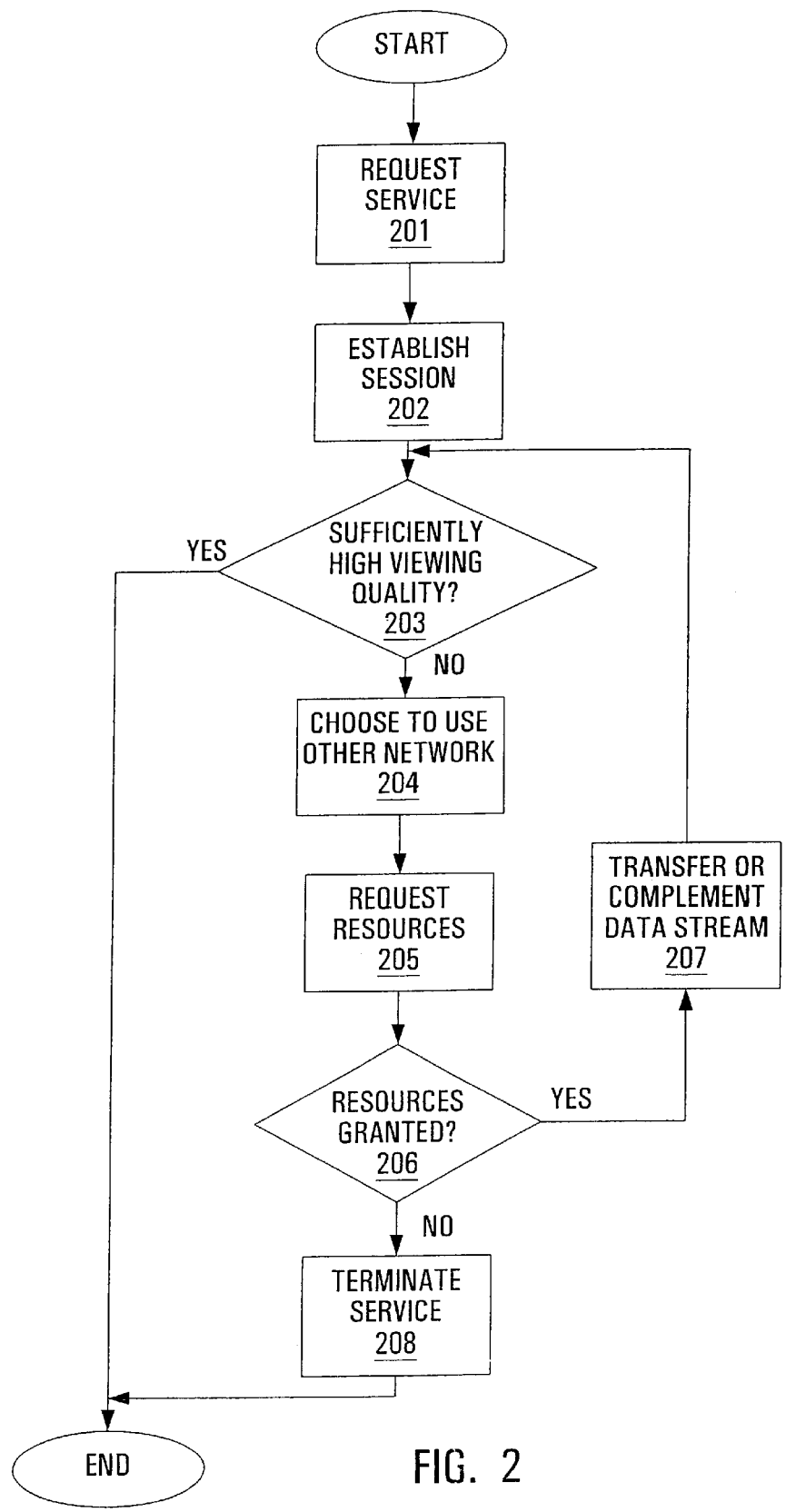
FIG. 2 is a flowchart illustrating an inventive method of improving the viewing quality of a streamed multimedia service delivered between terminals in a network configuration such as that of FIG. 1.

FIG. 2 shows an inventive procedure for delivering multimedia streams between two data terminals, and is particularly suited, but not limited, to the network configuration of FIG. 1. All messages referred to below are defined in ISO/IEC standard 14496-6 DMIF, with the exception of the SESSIONRESOURCEADDREQUEST( ) message , which is defined in a proposed extension to DMIF, namely ISO/IEC working document 14496-6 V2 WD 3.0. It is apparent to one skilled in the art that additional messages may need to be transferred in accordance with ISO/IEC standard 14496-6 and that only the most pertinent messages are mentioned hereunder.

Thus, with reference to box 201 in FIG. 2, application 12A in terminal 11A requests delivery of a streamed multimedia service using the DA_SERVICEATTACH( ) message. Delivery of the multimedia service is to originate from a corresponding application 12B in terminal 11B and will initially consist of the delivery of multimedia streams, prioritized according to QoS, across the homogeneous network 25.

In box 202, terminal middleware 13A in terminal 11A generates a globally unique session identifier and establishes a session with middleware 13B in terminal 11B using the DS_SESSIONSETUPREQUEST( ) message. The terminal middlewares 13A,B in the two terminals 11A,B then communicate using yet another protocol known as DMIF-to-DMIF signalling. Using the DA_CHANNELADD( ) message, application 12A selects an initial set of multimedia streams that it wishes to receive and which are expected to yield (and preferably exceed) a desired viewing quality.

Middlewares 13A and 13B then establish connections for the requested multimedia streams tagged with the session identifier in addition to an end-to-end-significant channel association tag (CAT) for each stream using the DS_DOWNSTREAMCHANNELADDREQUEST( ) message and, in addition, possibly the DS_TRANSMUXSETUPREQUEST( ) message. Also using the DA_CHANNELADD( ) message, applications 12A,B are given locally significant channel handlers to correspond to the CATs over which the two applications send and receive data streams.

One of the arguments of the DA_CHANNELADD( ) message associated with each stream is a QoS descriptor for that particular stream and effectively according a relative priority to the stream in question. On the basis of the QoS descriptor of each individual stream, the connection of higher priority streams takes precedence over the connection lower priority streams.

At this point, the selected multimedia streams are delivered from application 12B and middleware 13B to application 12A and middleware 13A, providing a certain viewing quality. In box 203, the middlewares 13A,B monitor the QoS of each delivered multimedia stream and the delivered viewing quality of the delivered multimedia service can be obtained by comparing the measured QoS of each stream to the QoS descriptor for that stream. If the delivered viewing quality meets (or exceeds) the desired viewing quality, then connection resources in addition to homogeneous network 25 are not required, and box 203 is exited via the "YES" path.

On the other hand, if the viewing quality measured as part of box 203 is found to be insufficient, application 12A or 12B is alerted to this fact. A number of options are then available to application 12A or 12B, including termination of the service, termination of undesired connections or, as is preferred and indicated in box 204, attempting to improve the viewing quality by accessing additional network resources within the context of the existing session.

An improvement in the overall viewing quality of the streamed multimedia service by using additional network resources can be achieved in at least two ways, namely, by transmitting supplementary multimedia streams across the additional network resources or by transferring certain ones of the initial multimedia streams over to the additional network resources. Preferably, the second option is chosen, that is to say, the highest-priority streams, (i.e., individual streams with high QoS requirements), are to be transmitted across the additional network resources consisting of the heterogeneous network arrangement comprising access networks 20,22 and backbone network 21. In box 205, middleware 13A uses the (original) session identifier to request resources in the heterogeneous network arrangement by communicating a SESSIONRESOURCEADDREQUEST( ) message to the network middleware 45 using control protocol 43A.

In box 206, the network middleware 45 verifies the request for additional network resources and evaluates whether or not there are sufficient resources available to transport multimedia streams at the required QoS across the heterogeneous network configuration. If not, it follows that the viewing quality cannot be improved and thus the request is not granted by the network middleware 45. At this point, the "NO" path is followed upon exiting box 206 and it is preferable to terminate the particular multimedia service being delivered, as indicated by box 208.

On the other hand, if there are sufficient resources in the heterogeneous network arrangement to transport high-priority multimedia streams, the network middleware 45 grants the request, leading to box 207. The session identifier is preserved while the middlewares 13A,B proceed to send data from one or more high-priority streams over the connections established on the heterogeneous network arrangement.

As mentioned above, it is also within the scope of the present invention to improve the viewing quality of the streamed multimedia service by augmenting the total number of multimedia streams making up the streamed multimedia service and transmitting the supplementary streams over the heterogeneous network arrangement.

Once the new connections through the heterogeneous network arrangement have been established, box 203 is re-entered, i.e., the viewing quality of the delivered multimedia service is measured again. If a sufficient improvement is detected, then the "YES" path in box 203 is followed and the inventive method terminates. Otherwise, streams of lower priority are requested to be transmitted across the heterogeneous network arrangement as described above with reference to boxes 204, 205 and 206. The procedure in FIG. 2 preferably continues in a cyclical manner until the desired viewing quality is realized.

The inventive method as described above is applicable to a situation in which terminal 11A is a client terminal requesting the delivery of a streamed multimedia service from a server terminal 11B, i.e., the delivery of multimedia content is in the direction from terminal 11B to terminal 11A. Of course, it is to be understood that for certain multimedia services which require a bi-directional flow of multimedia content, such as audio or video teleconferencing, the transport of multimedia streams in either direction operates as described herein for the case of one direction only.

While the preferred embodiment of the present invention has been described and illustrated, it will be apparent to one skilled in the art that numerous modifications and variations are possible. The scope of the invention, therefore, is only to be limited by the claims appended hereto.

I claim:

1. A method of delivering a streamed multimedia service from a first terminal to a second terminal, both terminals being directly connected to a first network and indirectly connected to at least one second network via respective access networks, each terminal comprising a respective terminal middleware, wherein the first and second terminal and each of the at least one second network are connected to a common network middleware, the method comprising the steps of:

the terminal middlewares in the first and second terminals establishing a session through the first network;

the first terminal transmitting a first plurality of multimedia streams to the second terminal across the first network, each stream being associated with a respective desired quality of service (QoS), measuring the QoS of each of the first plurality of streams and deriving a delivered viewing quality therefrom;

comparing the delivered viewing quality of the multimedia service to a specified viewing quality; and if the delivered viewing quality is interior to the specified viewing quality:

the first or second terminal sending a message to the network middleware, thereby requesting to use resources in the access networks and the at least one second network, the network middleware verifying whether sufficient resources exist in the access networks and the at least one second network without using resources in the first network; and if sufficient resources exist in the access networks and the at least one second network: the network middleware granting the request; the terminal middlewares in the first and second terminals establishing a connection through the access network and the at least one second network; and the first terminal transmitting at least one stream to the second terminal across the access networks and the at least one second network during said session.

2. A method according to claim 1, wherein the message is the SESSIONRESOURCEADDREQUEST( ) message in accordance with ISO/IEC working document 14496-6 V2 WD 3.0.

3. A method according to claim 1, wherein the at least one stream being transmitted across the access networks and the at least one second network is selected from the first plurality of streams.

4. A method according to claim 3, wherein the steps including and following the step of measuring the QoS of each of the first plurality of streams are performed until the delivered viewing quality meets or exceeds the specified viewing quality.

5. A method according to claim 1, wherein the at least one stream being transmitted across the access networks and the at least one second network belong to a second plurality of streams different from the first plurality of streams being transmitted across the first network.

6. A method according to claim 5, wherein the step of measuring the QoS of each of the first plurality of streams further comprises the step of measuring the QoS of each of the second plurality of streams and wherein the delivered viewing quality is a function of the QoS of each of the first and second pluralities of streams, and wherein said measuring step and subsequent steps are performed until the delivered viewing quality meets or exceeds the specified viewing quality.

7. A method according to claim 1, wherein the first method is homogeneous and wherein the access networks and the at least one second network form a heterogeneous network arrangement.

8. A computer-readable storage-medium for installation in a telecommunications network configuration comprising a plurality of terminals, at least one first network interconnecting the plurality of terminals, a plurality of access networks respectively connected to certain ones of the terminals and at least one second network interconnecting the access networks, comprising:

a plurality of terminal middlewares respectively connected to the plurality of terminals, for sending and receiving multimedia streams between the terminals;

a network middleware connected to the access networks, to the at least one second network and to the terminal middleware of the terminals connected to respective access networks, for verifying whether sufficient resources exist in the access networks and the at least one second network and for establishing connections among said terminals through the access networks and the at least one second network without using resources in the first network.

9. A communications network configuration comprising:

a homogeneous first network;

at least one second network;

a plurality of access networks connected to the second network by respective inter-working units;

a plurality of terminals connected to the first network and to the at least one second network, each terminal comprising a terminal middleware for sending and receiving multimedia streams; an application connected to the terminal middleware for reconstructing multimedia content from streams arriving from the terminal middleware and for segmenting multimedia content into streams passed to the terminal middleware; a first signalling map for connection to the first homogeneous network; and a second signalling map for connection to at least one of the plurality of access networks; and network middleware connected to the at least one second network, to the at least one of the plurality of access networks, to the inter-working units and to the second signalling map of each terminal, said network middleware being capable of:

receiving a request from the plurality of terminals requesting resources in the at least one of the plurality of access networks and the at least one second network;

verifying whether sufficient resources exist in the at least one of the plurality of access networks and the at least one second network without using resources in the homogeneous first network.

10. A network configuration according to claim 9, wherein each terminal further comprises an application interface connected between the terminal middleware and the application.

11. A network configuration according to claim 9, wherein each terminal further comprises a network interface between the terminal middleware and both the first and second signalling maps.

* * * * *